J. P. SMITH.
EXPANSIBLE CORE FOR VULCANIZING TIRES.
APPLICATION FILED AUG. 8, 1917.
1,299,045.  
Patented Apr. 1, 1919.
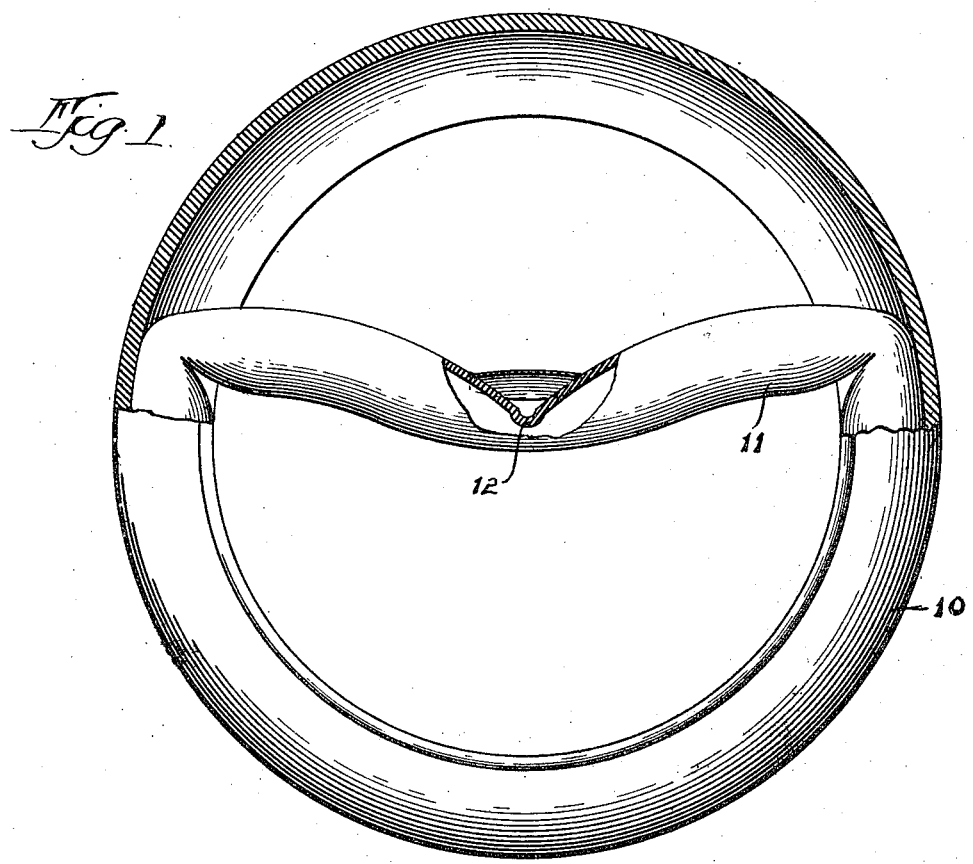
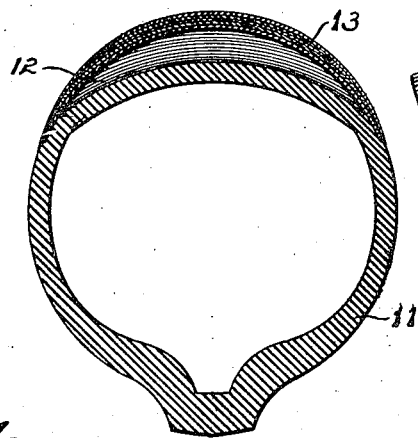
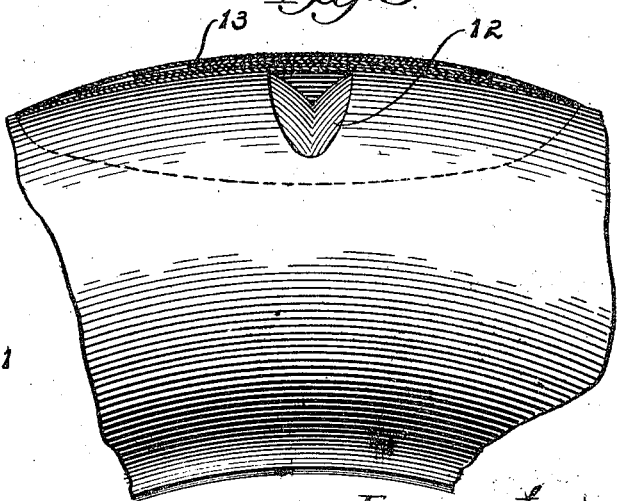
Witnesses:  
John W. Kittredge
Inventor  
John Paul Smith

UNITED STATES PATENT OFFICE.

JOHN PAUL SMITH, OF AKRON, OHIO, ASSIGNOR TO THE FIRESTONE TIRE & RUBBER COMPANY, OF AKRON, OHIO, A CORPORATION OF OHIO.

EXPANSIBLE CORE FOR VULCANIZING TIRES.

1,299,045.

Specification of Letters Patent. Patented Apr. 1, 1919.

Application filed August 8, 1917. Serial No. 185,155.

*To all whom it may concern:*

Be it known that I, JOHN PAUL SMITH, a citizen of the United States, and a resident of Akron, in the county of Summit, State of Ohio, have invented certain new and useful Improvements in Expansible Cores for Vulcanizing Tires, of which the following is a specification.

This invention relates to cores or bags which are used in molding pneumatic tires, and are inflated or expanded by fluid pressure to hold the tire in inflated condition while being cured. It is necessary to bend these bags in order to get them into the uncured tire casing and this bending or breaking will, after a few cures, form a permanent depression or break in the surface of the core. The depression or break in the surface of the core will cause a corresponding area of the tire casing to be without adequate pressure during curing, resulting in a soft spot in the tire.

It is the purpose of my invention to provide an air bag in which there is an intentionally molded depression in order to cause the operator always to break or bend the bag at that one place, and thus localizing any tendency for a depression in the surface of the bag. Having accomplished this purpose, I propose to provide a shield or bridge member permanently secured to the flap at a point near the artificially formed depression which shall extend over the depression and transmit the pressure of the bag evenly over all the area surrounding the depression.

In the drawings:

Figure 1 is an elevation and section of a tire casing showing the bag in the act of being placed in the casing.

Fig. 2 is a cross section through the bag at the depression.

Fig. 3 is a side elevation of the bag at the depression.

In the drawings, 10 represents a tire casing in which the expansible bag 11 is being positioned. The bag may be made of any suitable material, usually rubber and fabric. The outer or tread surface must be crimped or bent at one place in order to enable the bag to be placed in the tire. It would be possible to require the workman always to break the bag at one point but it would be extremely difficult to make certain that the instructions were carried out. I therefore propose to form in the tread or periphery of the bag, an artifically formed break or depression for when such depression is formed the workman not only has a mark by which he can always break the bag, but as the bag breaks or crimps more easily at this point his natural inclination is to bend it there.

The artificial, or previously formed depression or break is made in the tread portion of the bag while it is being cured and may easily be formed by inserting a piece of stock or some suitable filler on the outside of the bag and in the mold in which the bag is cured. In the form shown in the drawings the depression is designated at 12 and may be formed by a short piece of bead material located transversely of the bag at its tread portion, which bead material is removed after the bag is cured, forming a transverse groove in the bag.

Near the depression there is attached to the outer surface of the bag one end of a bridge piece or shield 13, the other end of the shield lying on the bag at the opposite side of the depression. This shield is preferably made of a plurality of layers of rubberized fabric, usually tapered off toward the edges by making each ply slightly smaller than the one underneath it. A wide cover ply may be positioned over the top of the shield to make the surface of the shield smooth. The flap or bridge piece 13 is circular or elliptical, of a size sufficient to cover the depression and considerable of the bag about the depression, and stiff enough to transmit the pressure of the bag equally throughout its area so that the depression or break in the bag does not affect the tire casing but the region adjacent the break receives as much pressure as the remainder of the tire and there is no loss through unequal pressure spots.

It is obvious that changes and modifications may be made without departing from the sprit of the invention or sacrificing any of its benefits.

I claim:

1. An expansible core for curing tires under pressure comprising an annular inflatable bag, of rubber and fabric, a permanent depression formed in the surface of the bag during curing thereof and a shield to cover said depression.

2. An expansible core for curing tires under pressure comprising an annular inflatable bag, a transverse depression in the tread portion of the bag, and a shield to cover said depression.

3. An expansible core for curing tires under pressure comprising an annular inflatable bag, a transverse depression in the tread portion of the bag, and a shield secured to said bag and extending over a short arc on the tread portion of the bag to cover said depression.

4. An expansible core for curing tires under pressure, comprising an annular inflatable bag of rubber and fabric, a transverse depression in the tread portion of the bag formed during the vulcanization thereof, and a shield secured to said bag and extending over a short arc in the tread portion of the bag to cover the depression.

JOHN PAUL SMITH.